(12) United States Patent
Young

(10) Patent No.: US 9,211,808 B2
(45) Date of Patent: Dec. 15, 2015

(54) POWER MANAGEMENT FOR A DRIVE SYSTEM

(71) Applicant: Clark Equipment Company, West Fargo, ND (US)

(72) Inventor: Christopher L. Young, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 13/730,235

(22) Filed: Dec. 28, 2012

(65) Prior Publication Data

US 2013/0238178 A1 Sep. 12, 2013

Related U.S. Application Data

(60) Provisional application No. 61/607,806, filed on Mar. 7, 2012.

(51) Int. Cl.
*B60L 15/20* (2006.01)
*B60W 10/103* (2012.01)
*B60W 10/06* (2006.01)
(Continued)

(52) U.S. Cl.
CPC ............. *B60L 15/20* (2013.01); *B60W 10/06* (2013.01); *F16H 61/468* (2013.01); *B60W 10/103* (2013.01); *B60W 30/18* (2013.01); *B60W 2300/17* (2013.01); *B60W 2710/0666* (2013.01); *B60W 2710/1005* (2013.01); *Y02T 10/7258* (2013.01)

(58) Field of Classification Search
CPC ................................. B60L 15/20; G06F 19/00
USPC .......................................... 701/22, 29, 63, 70
See application file for complete search history.

(56) References Cited

U.S. PATENT DOCUMENTS 3,884,038 A 5/1975 Forster et al.
4,967,557 A * 11/1990 Izumi et al. .................... 60/423
5,576,962 A 11/1996 Ferguson et al.
(Continued)

FOREIGN PATENT DOCUMENTS

EP 1447260 A1 8/2004
EP 2381081 A2 10/2011

OTHER PUBLICATIONS

Search Report and Written Opinion dated Apr. 10, 2013 for International Application No. PCT/US2012/072057 filed Dec. 28, 2012, 14 pages.

*Primary Examiner* — Calvin Cheung
*Assistant Examiner* — Martin Weeks
(74) *Attorney, Agent, or Firm* — John D. Veldhuis-Kroeze; Westman, Champlin & Koehler, P.A.

(57) ABSTRACT

A power machine having an engine that generates a torque output and a power conversion system configured to receive the torque output and provide a drive power signal in response to actuation signals for propelling the machine is disclosed. An engine controller provides an engine torque data signal indicative of a torque load on the engine. A user input device generates an input signal indicative of intention to propel the machine. An electronic controller is in communication with the user input device, the power conversion system, and the engine controller. The electronics controller receives the input signal and provides actuation signals to the power conversion system. The electronic controller further provides the actuation signals as a function of the engine torque data signal to limit the engine torque load.

18 Claims, 6 Drawing Sheets

(51) Int. Cl.
*F16H 61/468* (2010.01)
*B60W 30/18* (2012.01)

(56) References Cited

U.S. PATENT DOCUMENTS

| | | | |
|---|---|---|---|
| 5,996,342 A | 12/1999 | Khan et al. | |
| 6,064,933 A | 5/2000 | Rocke | |
| 8,036,797 B2 | 10/2011 | Johnson et al. | |
| 8,060,284 B2 | 11/2011 | Hendryx | |
| 2005/0177293 A1* | 8/2005 | Ammann et al. | 701/54 |
| 2006/0014608 A1 | 1/2006 | Mitchell et al. | |
| 2008/0227596 A1* | 9/2008 | Schifferer | 477/52 |
| 2008/0250259 A1 | 10/2008 | Kraft et al. | |
| 2009/0220352 A1 | 9/2009 | Carstensen | |
| 2009/0293468 A1* | 12/2009 | Kim | 60/327 |
| 2010/0021281 A1 | 1/2010 | Nelson | |
| 2010/0154403 A1* | 6/2010 | Brickner et al. | 60/452 |
| 2010/0332102 A1 | 12/2010 | Akiyama et al. | |
| 2011/0040433 A1* | 2/2011 | Steuernagel | 701/22 |
| 2011/0056194 A1 | 3/2011 | Wojcicki et al. | |
| 2011/0213522 A1* | 9/2011 | Stevens et al. | 701/22 |
| 2011/0264335 A1 | 10/2011 | Zhao et al. | |
| 2012/0029768 A1* | 2/2012 | Anderson | 701/36 |
| 2012/0152642 A1* | 6/2012 | Takahashi et al. | 180/307 |

* cited by examiner

POWER MANAGEMENT FOR A DRIVE SYSTEM

CROSS-REFERENCE TO RELATED APPLICATION

This application claims the benefit of U.S. Provisional Patent Application 61/607,806 filed on Mar. 7, 2012, the contents of which are incorporated by reference into this application in their entirety.

FIELD

Disclosed embodiments relate to power machines with electronic drive control systems.

BACKGROUND

Some power machines including skid steer loaders, tracked loaders, steerable axle loaders, excavators, telehandlers, walk behind loaders, trenchers, and the like, employ engine powered hydraulic or hydrostatic drive systems. Some of these power machines have employed electronic drive control systems for controlling their hydrostatic drive systems. Drive control systems typically include operator input devices that are capable of being manipulated by an operator to provide signals that indicate a drive control intention. Signals from the operator input devices are provided to one or more actuation devices that are capable of varying the displacement of one or more hydrostatic pumps in the hydrostatic drive system. Hydraulic and hydrostatic drive systems create large power loads on a power source, particularly when a power machine is engaged in, for example, digging or load carrying operations. Excessive power loads on a power source such as an engine—loads that can be created by drive systems and other function systems on a power machine—can result in reduced efficiency and performance, including the potential that excessive loads may cause the engine to stall. It is known that a particular engine performs most efficiently at a given percentage of its maximum torque output. It is desirable to maintain operation of the engine at or near that target torque output.

The discussion above is merely provided for general background information and is not intended to be used as an aid in determining the scope of the claimed subject matter.

SUMMARY

Disclosed embodiments include power management systems and methods for controlling drive systems of power machines. In one embodiment, a power machine has an engine that generates a torque output and a power conversion system that receives the torque output and provides a drive power signal in response to actuation signals for propelling the machine. An engine controller provides an engine torque data signal indicative of a torque load on the engine. A user input device generates an input signal indicative of intention to propel the machine. An electronic controller is in communication with the user input device, the power conversion system, and the engine controller to receive the input signal and provide actuation signals to the power conversion system. The electronic controller provides the actuation signals as a function of the engine torque data signal to limit the engine torque load.

In another embodiment, a power management system for a power machine has an engine that generates a torque output and an engine controller that provides an engine torque data signal indicative of an engine torque load. A user input device provides a user input in response to actuation by a user indicate of an intention to drive the machine over a support surface. A power conversion system includes a hydrostatic pump that is coupled to the engine and receives the torque output. An electronic controller is coupled to the user input device, the power conversion system and engine controller. The electronic controller receives the user input and to responsively provide actuation signals to the power conversion system to implement travel functions. The electronic controller receives the engine torque data signal from the engine controller and provides the actuation signals according to a torque limiting profile.

In yet another embodiment, a method of managing an engine torque load on a power machine is disclosed. The method includes receiving an indication of the engine torque load, receiving an input from an operator input device, and providing actuation signals, in response to the input from the operator input device, to a power conversion system coupled to the engine of the power machine. The actuation signals are provided as a function of the engine torque load to implement a constraint on a rate of change of pump displacement of a hydrostatic pump according to a torque limiting profile.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Before any embodiments are disclosed in detail, it is to be understood that concepts disclosed herein are not limited in their application to the details of construction and the arrangement of components set forth in the following description or illustrated in the following drawings. That is, the embodiments disclosed herein are illustrative in nature. The concepts illustrated in these embodiments are capable of being practiced or being carried out in various ways. The phraseology and terminology used herein is for the purpose of description and should not be regarded as limiting. Words such as "including," "comprising," and "having" and variations thereof as used herein are meant to encompass the items listed thereafter, equivalents thereof, as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
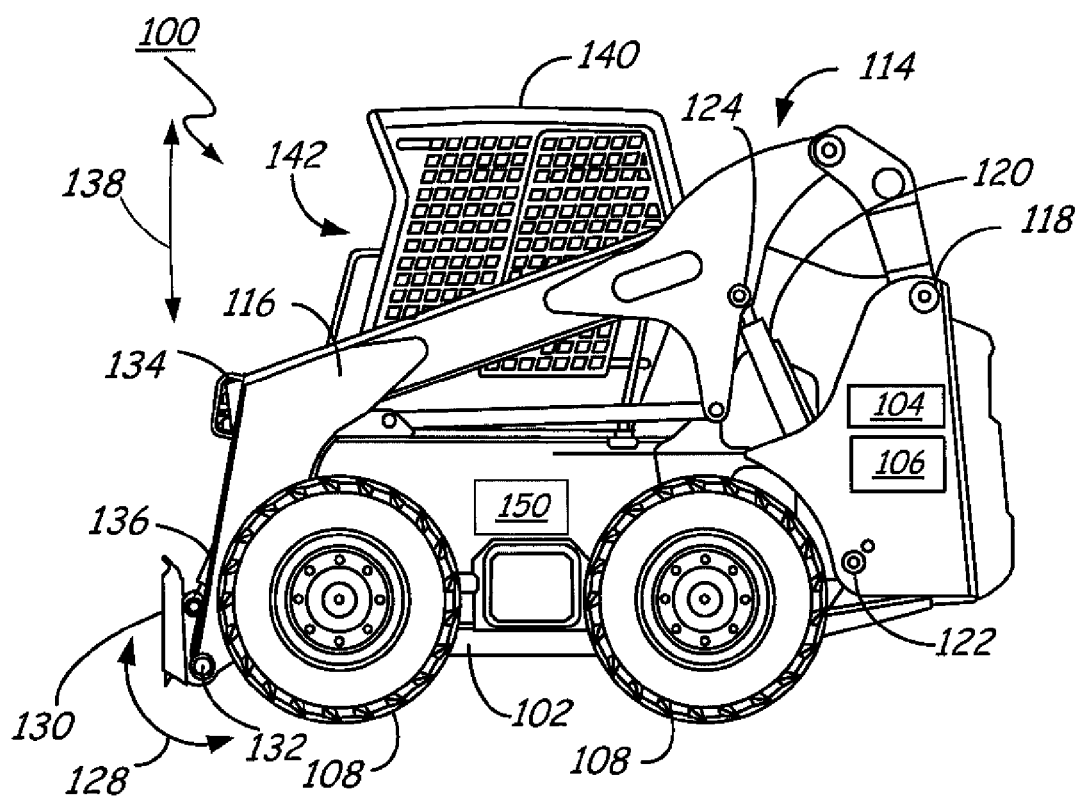
FIG. 1 is a side view of a skid steer loader embodiment of a power machine having an electronic control unit configured to implement power management methods in accordance with disclosed embodiments.

FIG. 1 is a side view of a representative power machine 100 upon which the disclosed embodiments can be employed. The power machine 100 illustrated in FIG. 1 is a skid loader, but other types of power machines such as tracked loaders, steerable wheeled loaders, including all-wheel steer loaders, excavators, telehandlers, walk behind loaders, trenchers, and utility vehicles, to name but a few examples, may employ the disclosed embodiments. The power machine 100 includes a supporting frame or main frame 102, which supports a power source 104, which in some embodiments is an internal combustion engine. A power conversion system 106 is operably coupled to the power source 104. Power conversion system 106 illustratively receives power from the power source 104 and operator inputs to convert the received power to power signals in a form that is provided to and utilized by functional components of the power machine. In some embodiments, such as with the power machine 100 in FIG. 1, the power conversion system 106 includes hydraulic components such as one or more hydraulic pumps and various actuators and valve components that are illustratively employed to receive and selectively provide power signals in the form of pressurized hydraulic fluid to some or all of the actuators used to control functional components of the power machine 100. For example, a control valve (not shown) can be used to selectively provide pressurized hydraulic fluid from a hydraulic pump to actuators such as hydraulic cylinders. Other types of control systems are contemplated. For example, the power conversion system 106 can include electric generators or the like to generate electrical control signals to power electric actuators. For the sake of simplicity, the actuators discussed in the disclosed embodiments herein are referred to as hydraulic or electrohydraulic actuators, but other types of actuators can be employed in some embodiments.

Among the functional components that are capable of receiving power signals from the power conversion system 106 are tractive elements 108, illustratively shown as wheels, which are configured to rotatably engage a support surface to cause the power machine to travel. Other examples of power machines can have tracks or other tractive elements instead of wheels. In an example embodiment, a pair of hydraulic motors (not shown in FIG. 1), are provided to convert a hydraulic power signal into a rotational output. In power machines such as skid steer loaders, a single hydraulic motor is coupled to both of the wheels on one side of the power machine. Alternatively, a hydraulic motor can be provided for each tractive element in a machine. In a skid steer loader, steering is accomplished by providing unequal rotational outputs to the tractive element or elements on one side of the machine as opposed to the other side. In some power machines, steering is accomplished through other means, such as, for example, steerable axles.

The power machine 100 also includes a lift arm structure 114 that is capable of being raised and lowered with respect to the frame 102. The lift arm structure 114 illustratively includes a lift arm 116 that is pivotally attached to the frame 102 at attachment point 118. An actuator 120, which in some embodiments is a hydraulic cylinder configured to receive pressurized fluid from power conversion system 106, is pivotally attached to both the frame 102 and the lift arm 116 at attachment points 122 and 124, respectively. Extension and retraction of the actuator 120 causes the lift arm 116 to pivot about attachment point 118 and thereby be raised and lowered along a generally vertical path indicated approximately by arrow 138. The lift arm 116 is representative of the type of lift arm that may be attached to the power machine 100. It should be appreciated that the lift arm structure 114 shown in FIG. 1 includes a second lift arm and actuator disposed on an opposite side of the of the power machine 100, although neither is shown in FIG. 1. It should be appreciated further that other lift arm structures, with different geometries, components, and arrangements can be coupled to the power machine 100 without departing from the scope of the present discussion.

An implement carrier 130 is pivotally attached to the lift arm 116 at attachment point 132. One or more actuators such as hydraulic cylinder 136 are pivotally attached to the implement carrier and the lift arm structure 114 to cause the implement carrier to rotate under power about an axis that extends through the attachment point 132 in an arc approximated by arrow 128 in response to operator input. In some embodiments, the one or more actuators pivotally attached to the implement carrier and the lift arm assembly are hydraulic cylinders capable of receiving pressurized hydraulic fluid from the power conversion system 106. The implement carrier 130 is configured to accept and secure any one of a number of different implements to the power machine 100 as may be desired to accomplish a particular work task. The power machine 100 provides a source, accessible at connection point 134 of power and control signals that can be coupled to an implement to control various functions on such an implement, in response to operator inputs. In one embodiment, connection point 134 includes hydraulic couplers that are connectable to an implement for providing power signals in the form of pressurized fluid provided by the power conversion system 106 for use by an implement that is operably coupled to the power machine 100. Alternatively or in addition, connection point 134 includes electrical connectors that can provide power signals and control signals to an implement to control and enable operation of functional components on an implement.

Power machine 100 also illustratively includes a cab 140, which is supported by the frame 102. Cab 140 defines, at least in part, an operator compartment 142. Operator compartment 142 typically includes an operator seat (not shown in FIG. 1) and operator input and display devices (not shown in FIG. 1) accessible and viewable from a sitting position in the seat. When an operator is seated properly within the operator compartment 142, the operator can manipulate operator input devices to control such functions as driving the power machine 100, raising and lowering the lift arm structure 114, rotating the implement carrier 130 about the lift arm structure 114 and make power and control signals available to an implement via the sources available at connection point 134.

In some embodiments, an electronic controller 150 (shown in FIGS. 1 and 2) is configured to receive input signals from operator input devices and provide control signals to the power conversion system 106 and to implements via connection point 134. It should be appreciated that electronic controller 150 can be a single electronic control device with instructions stored in a memory device and a processor that reads and executes the instructions to receive input signals and provide output signals all contained within a single enclosure. Alternatively, the electronic controller 150 can be implemented as a plurality of electronic devices coupled on a network. The disclosed embodiments are not limited to any single implementation of an electronic control device or devices. The electronic device or devices such as electronic controller 150 are programmed and configured by the stored instructions to function and operate as described.

Figure 2:
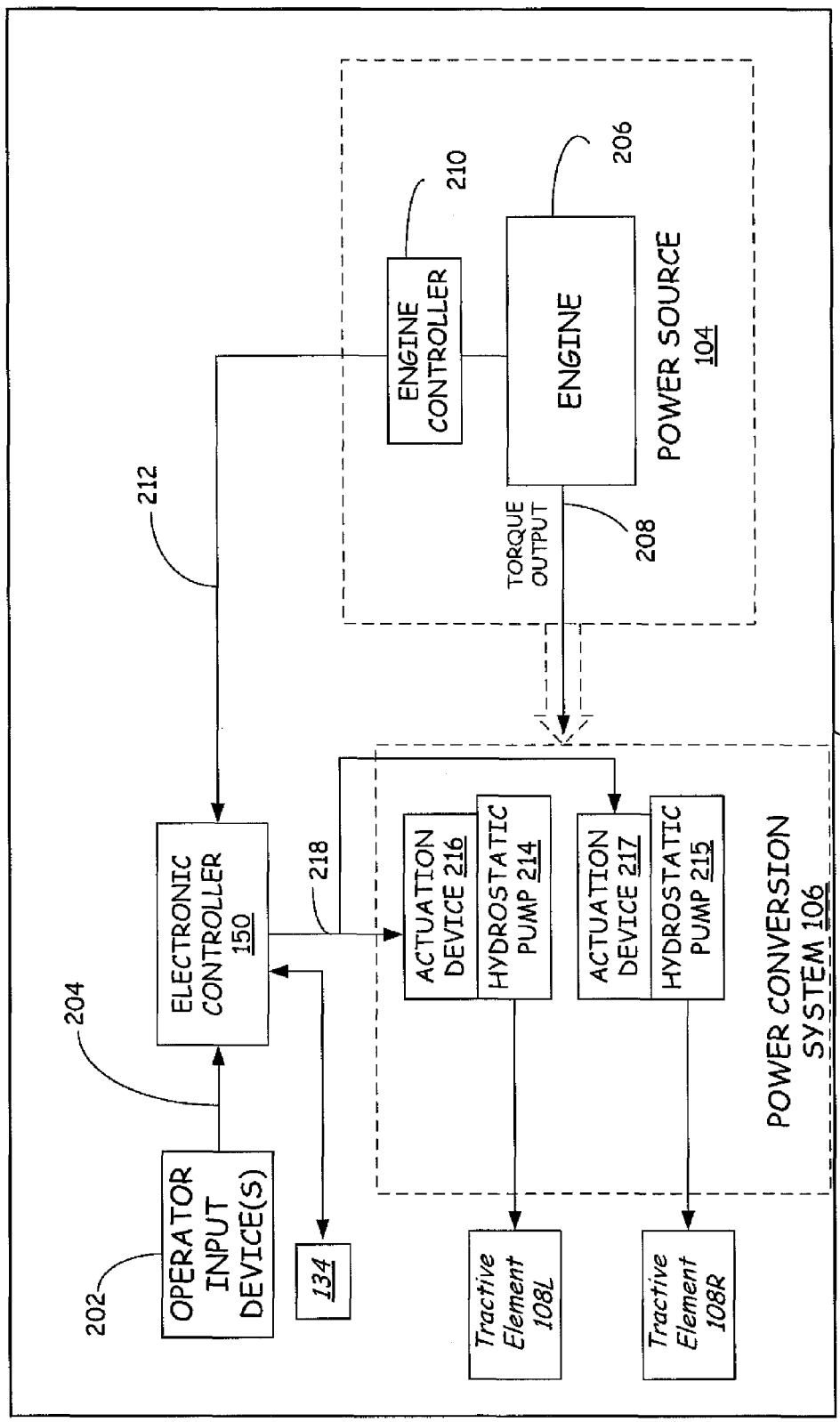
FIG. 2 is a block diagram illustrating components of the power machine of FIG. 1 configured to implement power management methods in accordance with disclosed embodiments.

Referring now to FIG. 2, further features of power machine 100 are shown in accordance with exemplary embodiments in block diagram form. One or more operator or user input devices 202, are operatively coupled to electronic controller 150 via a network 204 or other hard wired or wireless connection. The operator input devices 202 are manipulable by an operator provide control signals to the electronic controller 150 via network 204 to communicate control intentions of the operator. The operator input devices 202 are to provide control signals for controlling functions on the machine such as the speed and direction of travel, raising and lowering the lift arm structure 114, rotating the implement carrier 130 relative to the lift arm structure, and providing power and control signals to an implement to name a few examples. Operator input devices 202 can take the form of joystick controllers, levers, foot pedals, switches, actuable devices on a hand grip, pressure sensitive electronic display panels, and the like.

In the embodiment illustrated in FIG. 2, power source 104 includes engine 206, typically an internal combustion engine, which provides a variable speed torque output 208. The torque output 208 is provided as an input to power conversion system 106. An engine controller 210, which can be an electronic control unit, is operably coupled to or integrated with engine 206. Engine controller 210 is also operably coupled to electronic controller 150 over a serial bus 212 or other hard wired or wireless network connection. Power machine electronic controller 150 and engine controller 210 are capable of communicating over serial bus or network connection 212 to exchange information related to the control and/or to monitoring operation of engine 206.

As shown in FIG. 2, the power conversion system 106 includes a pair of hydrostatic pumps 214 and 215, one for each side of power machine 100. Actuation device 216 and 217 are operably coupled to the hydrostatic pumps 214 and 215, respectively. The actuation devices 216 and 217 control the displacement, and the rate of change of the displacement, of their respective pump 214 and 215 in response to signals provided by electronic controller 150, via a control network 218. The signals provided by control network 218 can be any suitable control signals, including voltage levels, current signals, or a serial data communication stream. The hydrostatic pumps 214 and 215 are operably coupled to tractive elements 108L and 108R, respectively. The tractive elements 108L are positioned on a left side of the power machine 100 (as are the tractive elements 100 shown in FIG. 1), and the tractive elements 108R are positioned on a right side of power machine 100. Although shown as being tied together at 218, it should be understood that the signals provided to each of the actuation devices 216 and 217 are provided so that hydrostatic pumps 214 and 215 are independently controlled. A plurality of networks and network connections are shown in FIG. 2 and described herein. It should be appreciated that any or all of these networks can, in practice, be combined together. In some embodiments, a power machine such as power machine 100 can have a single communication network to which each electrical or electronic component that is connectable to a network is connected.

Figure 3:
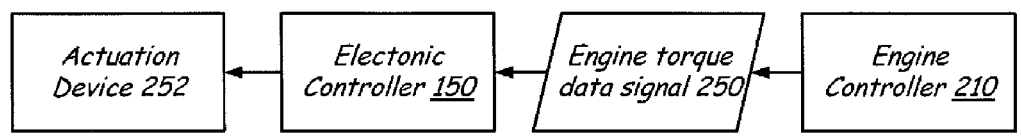
FIG. 3 is a block diagram illustrating a data transfer from an engine controller to an electronic controller on the power machine of FIG. 1.

In exemplary embodiments as shown in FIG. 3, the power machine electronic controller 150 is configured to receive an engine torque data signal 250 from the engine controller 210. The engine torque data signal 250 provided by the engine controller 210 can be in the form of a broadcast on a serial communication bus (such as is described above and shown in FIG. 2) or via any other suitable method for transmitting such data. The electronic controller 150 also provides an actuation signal to one or more actuation devices, collectively represented by actuation device 252. Examples of actuation devices 252 include the actuation devices 216 and 217. Another example of an actuation device would be a control valve (not shown) for selectively providing pressurized hydraulic fluid to a lift arm cylinder. The engine torque data signal 250 provides an indication of a load on the power source 104 of power machine 100. In one embodiment, the electronic controller 150 is configured to responsively limit the amount of torque load applied to engine 206 by managing the output signals provided to one or more actuation devices 252. By managing output signals provided to one or more actuation devices, the electronic controller can effectively limit the load to the engine applied in a high load condition.

Figure 4:
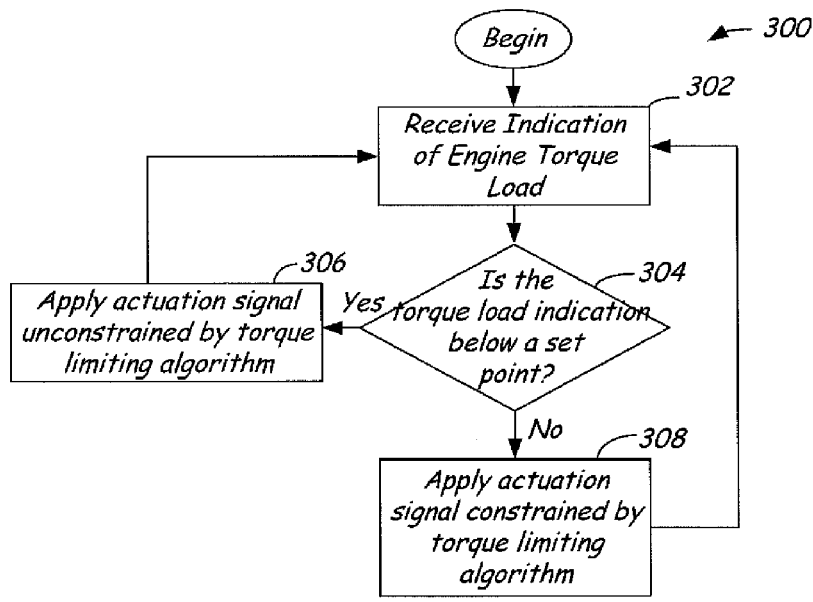
FIG. 4 is a flowchart indicating a power management method according to one illustrative embodiment.

FIG. 4 illustrates a method 300 of managing output signals provided to an actuation device such as actuation device 252 (illustrated in FIG. 3) according to one illustrative embodiment. At block 302, the electronic controller 150 receives an indication of the engine torque load from the engine controller 210. In one embodiment, the indication is provided in the form of the engine torque data signal 250. The engine controller 210 can periodically broadcast the engine torque data signal 250 or alternatively, the engine controller 210 can provide the signal in response to a data request from the engine controller 210. At decision block 304, the engine torque indication is compared against a set point. If the engine torque load indication is determined to be less than the first set point no particular limit such as by a torque limiting algorithm is applied to an actuation signal provided to the actuation device 252 as shown at block 306. If, however, it is determined at block 304 that the torque load indicator is above a set point, the actuation signal provided to the actuation device 252 is constrained by a torque limiting algorithm as shown at block 308. While a single actuation device 252 is shown in FIG. 3 and referred to in FIG. 4, it should be appreciated that a plurality of actuation devices 252 can exist, with each of the actuation devices being subjected to constraints by a torque limiting algorithm based on the torque load indication provided by the engine controller 210. It should be further appreciated that the constraint applied by the torque limiting algorithm can vary based on the level of the torque load indication.

Figure 5:
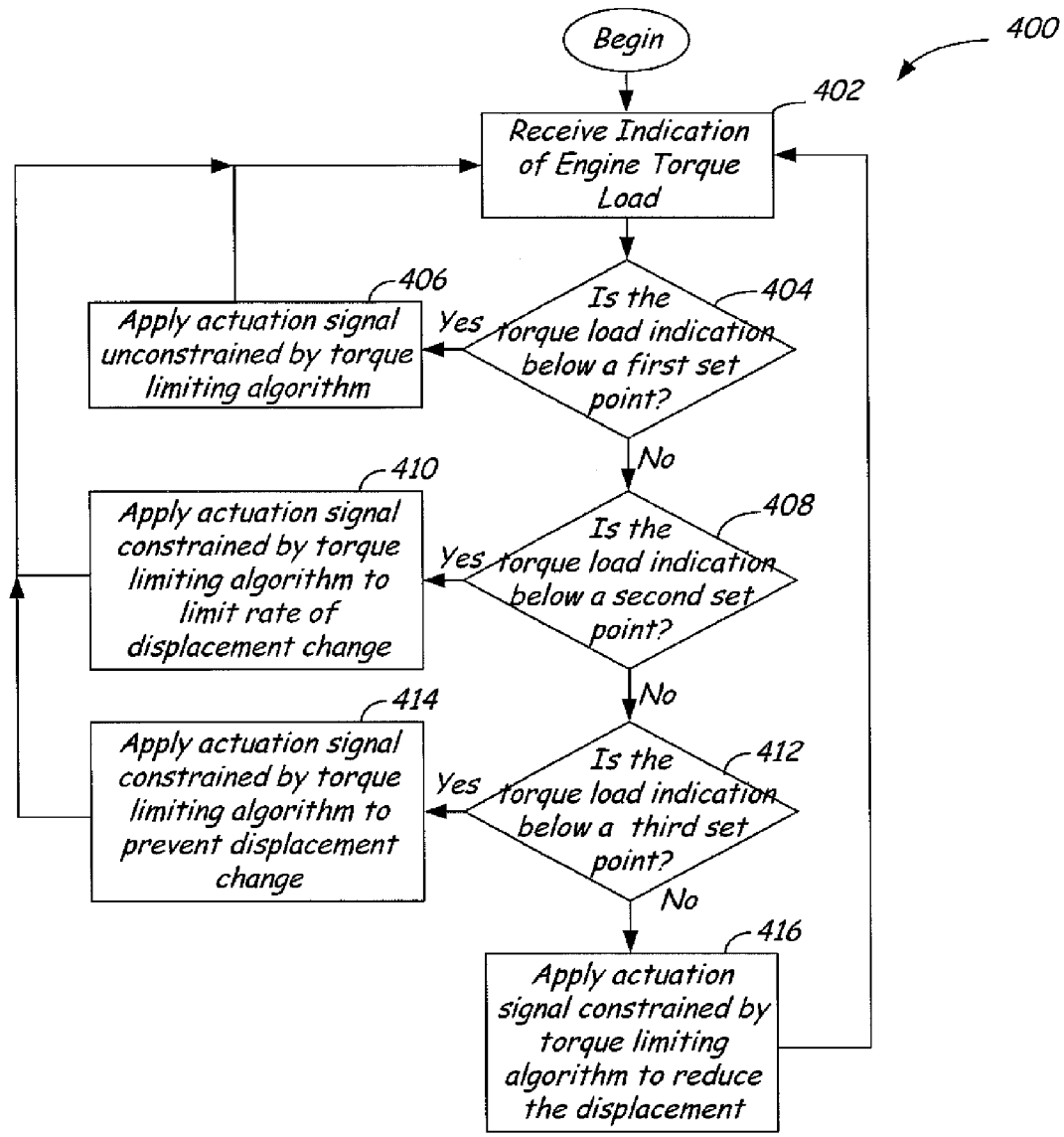
FIG. 5 is a flow chart indicating a power management method according to another illustrative embodiment.
Figure 6:
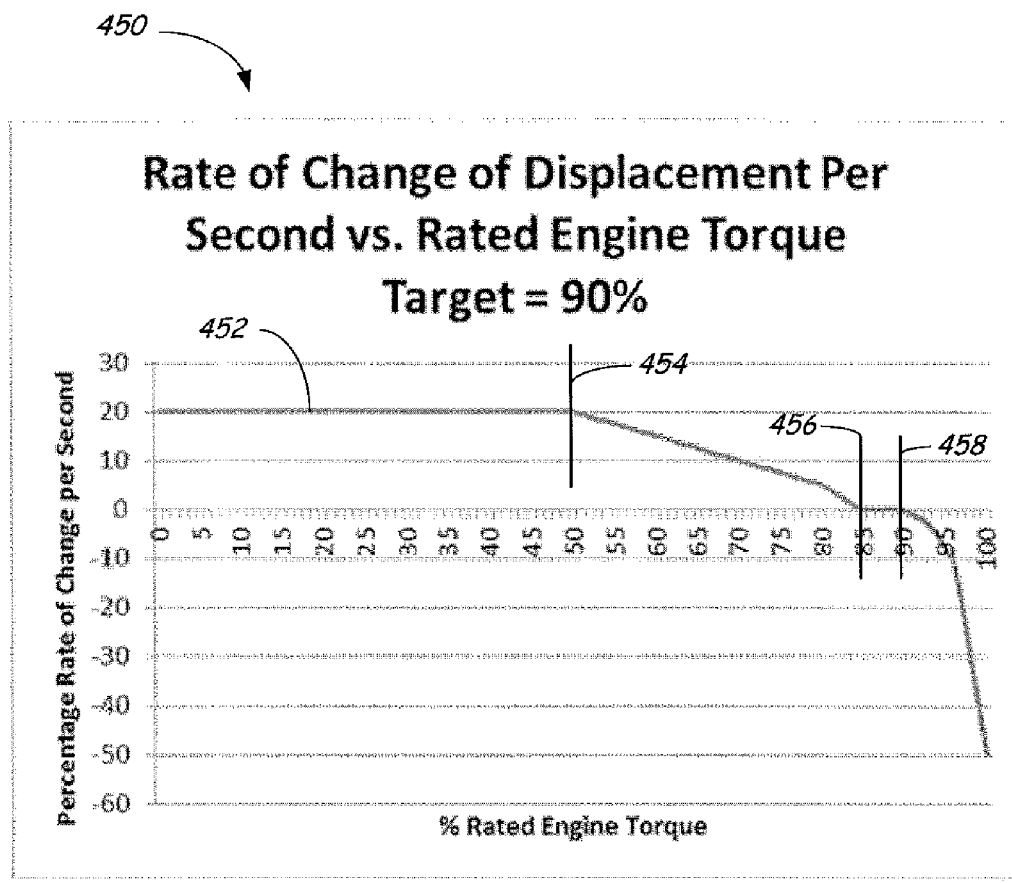
FIG. 6 is a graph illustrating a rate of change of a hydrostatic pump displacement, as a function of percentage of rated engine torque, used to control a hydrostatic pump in an exemplary embodiment.

FIG. 5 illustrates a method 400 of managing actuation signals to actuation devices 216 and 217 (shown in FIG. 2) according to one illustrative embodiment. A graph 450 of a torque limiting algorithm applied to the actuation devices 216 and 217 according to method 400 illustrated in FIG. 6. The graph 450 illustrates a torque limiting function for an optimum torque rating of 90% of maximum torque. The curve 452 shown in graph 450 provides a maximum acceleration allowed for the actuation devices 216 and 217, given a percentage of the maximum torque load of an engine. A first set point 454, a second set point 456, and a third set point 458 are shown as vertical lines in the graph 450 and described in more detail below. The method 400 includes a block 402, which represents the reception of a torque load indication of the engine in the form of an engine torque data signal 250 as shown in FIG. 3. At decision block 404, the torque load indication is compared against the first set point 454. If the torque load indication indicates a load less than the first set point 454, the actuation signals applied to actuation devices 216 and 217 are unconstrained by the torque limited algorithm as shown at block 406. As shown in FIG. 6, a maximum rate of change of displacement of the hydrostatic pumps 214 and 215 (shown in FIG. 2) is constrained to 20 percent per second, but that constraint is provided not because of torque limiting concerns but rather to limit acceleration of the power machine for other considerations. It should be appreciated, of course, that during operation of a machine that an operator will often provide a generally constant signal for travel, and that the torque limiting algorithm discussed here, except for specific instances provided later in the method 400 discussed below are directed at limiting a rate of change of displacement and not a reduction in displacement.

At decision block 408, it has already been established that the torque load is above the first set point and thus, the actuation signal provided to the actuation devices 216 and 217 is constrained. The method at decision block 408 next determines whether the torque load indication is below the second set point 456. If it is determined that the torque load is below the second set point 456, the actuation signals provided to the actuation devices 216 and 217 are constrained to limit the maximum rate at which the displacement is allowed to change, as shown at block 410. In one embodiment, the constraint function applied in block 410 is as is shown in curve 452 between the first set point 454 and the second set point 456. In other embodiments, other curves can be employed.

If, at decision block 408, it is determined that the torque load indication is not below the second set point 456, at decision block 412, the torque load indication is compared against the third set point 458. If the torque load is less than the third set point, the actuation signals provided to the actuation devices 216 and 217 are constrained to not allow the displacement of the motors to increase at all. (Of course, if an operator provides an input indicative reducing displacement, the electronic controller 150 will provide actuation signals to the actuation devices 216 and 217 to reduce the displacement of the pumps 214 and 215. The functions shown in FIG. 6 and method 400 assume that the operator has indicated through operator inputs 200 an intention to increase the displacement of the pumps.) In this region, i.e., between the second and third set points 456 and 458, the torque load is at or near the targeted level, which is preferably selected to be at or near the peak efficiency of the engine. This constraint is illustrated at block 414. If, however, the torque load indication is higher than the third set point 458, the actuation devices 216 and 217 are constrained to reduce the displacement as shown in block 416 and curve 452. This is the case even when the operator is not providing an intention to increase the displacement of the pumps. For example, if the operator inputs indicate an intention to maintain a constant displacement, when the torque load indication is higher than the set point 458, the electronic controller 150 will still send actuation signals to reduce the displacement of pumps 214 and 215. As the torque load approaches 100% of the rated capacity, the rate at which the displacement is reduced rapidly increases.

In some embodiments, electronic controller 150 is configured to also incorporate a priority system to ensure that other demands on the engine (i.e. demands other than the drive system) are supplied power first, with the remaining power being supplied to the drive system. For example, if a powered implement having a minimum or optimal engine torque requirement for proper operation is attached to power machine 100, this information can be communicated from an implement controller to the electronic controller 150 and used to control the torque provided to the drive system. For example, if the electronic controller 150 is instructed that the powered implement requires 70% of the available engine torque to function optimally, 20% of the torque (assuming a target of 90%) would be provided for the drive system, and the displacement of the hydrostatic pumps 214 and 215 would be adjusted accordingly by electronic controller 150 using actuation devices 216 and 217. However, in some embodiments, electronic controller 150 is configured such that it does not implement such a priority system and only reduces the displacement of the hydrostatic pumps 214 and 215 to reduce the overall torque load on the engine without consideration of giving priority to implement functions or other functions.

Figure 7:
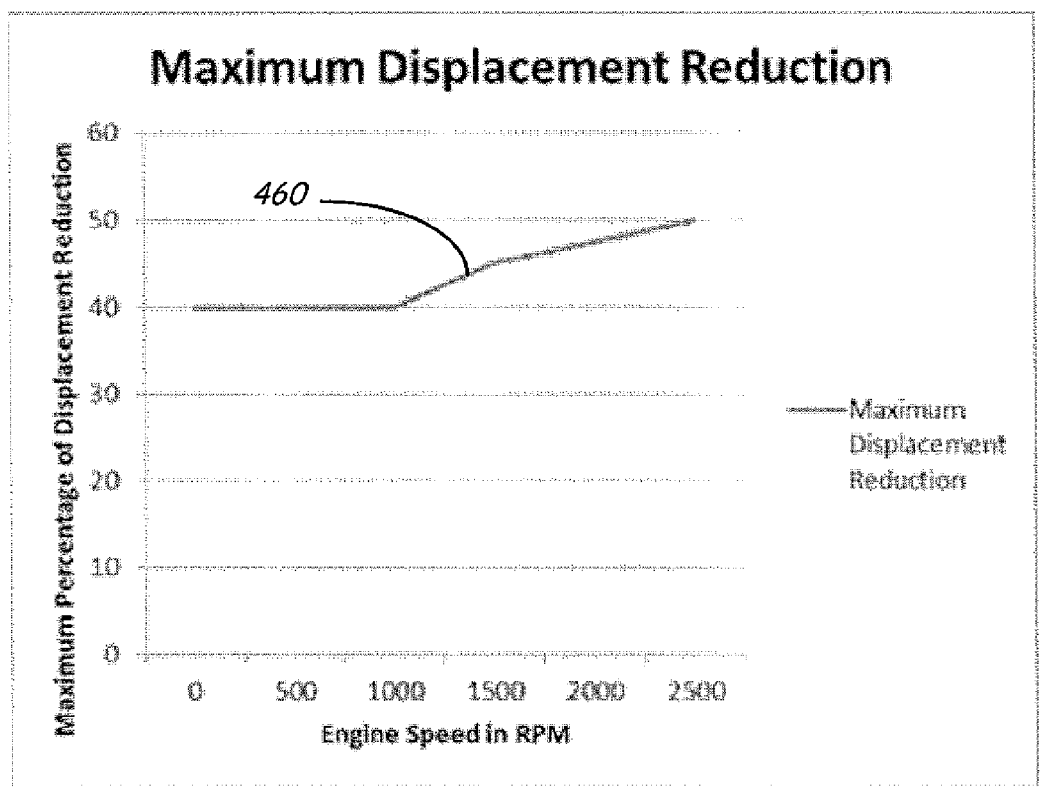
FIG. 7 is a graph illustrating maximum pump displacement reduction, as a function of engine speed, used to control a hydrostatic pump in an exemplary embodiment.

In some embodiments, a maximum amount of reduced hydrostatic pump displacement (measured in terms of the reduction of the actuation signals provided to the actuation devices 216 and 217) is set such that when this level of reduction is reached, the displacement of the hydrostatic pumps 214 and 215 are not further reduced. In one example, the maximum amount of hydrostatic pump displacement reduction is programmable and can be automatically varied by electronic controller 150 based on the measured engine speed of the power machine 100. Electronic controller 150 can monitor engine speed by communication with engine controller 210 over serial bus 212. The chart shown in FIG. 7 illustrates a limiting curve 460 that provides an illustration of how this maximum would vary by engine speed in an example embodiment. As illustrated, the higher the engine speed of engine 206, the higher the maximum displacement reduction imposed by electronic controller 150 on hydrostatic pumps 214 and 215.

In accordance with some exemplary embodiments, a hydrostatic pump displacement rate of change profile or transfer function is used in controlling the hydrostatic pump 214 as a function of the actual torque output of engine 206. Further, some embodiments base the hydrostatic pump displacement rate of change profile on a target engine torque, for example, in terms of a target percentage of an engine torque rating for the engine. Some embodiments control the hydrostatic pump displacement by imposing a limit on the total amount that the displacement can be reduced based on the engine speed of the power machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, different types of power machines can be configured to implement the disclosed drive system power management methods. Further, while particular hydrostatic pumps and control systems are illustrated, other types of hydraulic pumps and other control system configurations can also be used. In addition, while embodiments discussed above refer to a pair hydrostatic pumps, in some embodiments a single hydrostatic pump may be employed. Other examples of modifications of the disclosed concepts are also possible, without departing from the scope of the disclosed concepts.

What is claimed is:

1. A power machine having an engine that generates a torque output and a power conversion system configured to receive the torque output and provide a drive power signal in response to actuation signals for propelling the machine, comprising:

an engine controller configured to provide an engine torque data signal indicative of a torque load on the engine;

a user input device configured to generate an input signal indicative of manipulation of the user input device by the user to command the machine to be propelled; and an electronic controller in communication with the user input device, the power conversion system, and the engine controller and configured to receive the input signal and provide actuation signals to the power conversion system, wherein the electronic controller is further configured to provide the actuation signals as a function of the engine torque data signal to limit the engine torque load, and wherein the electronic controller is configured to reduce a displacement of a hydrostatic pump when the engine torque is above a given torque load even when the input signal from the user input device is indicative of a manipulation of the user input device to command an increase in the displacement of the hydrostatic pump.

2. The power machine of claim 1, wherein the electronic controller is configured to provide the actuation signals unconstrained by a torque limiting algorithm if the engine torque load is below a first set point torque and to provide the actuation signals constrained by the torque limiting algorithm if the engine torque load is above the first set point torque.

3. The power machine of claim 2, wherein the power conversion system includes a hydrostatic pump and wherein when the engine torque load is above the first set point torque, the torque limiting algorithm affects a rate of displacement change of the hydrostatic pump.

4. The power machine of claim 3, wherein when the engine torque load is above the first set point torque but below a second set point torque that is higher than the first set point torque, the electronic controller is further configured to provide the actuation signals constrained by the torque limiting algorithm to prevent a displacement increase of the hydrostatic pump.

5. The power machine of claim 4, wherein when the engine torque load is below a third set point torque that is higher than the second set point torque, the electronic controller is further configured to provide the actuation signals constrained by the torque limiting algorithm to reduce the displacement of the hydrostatic pump.

6. The power machine of claim 3, wherein the electronic controller is configured to implement a rate of change of displacement profile as a function of a comparison of the engine torque load to a plurality of set point torques.

7. A power management system for a power machine having an engine that generates a torque output and an engine controller configured to provide an engine torque data signal indicative of an engine torque load, the power management system comprising:
 a user input device configured to provide a user input in response to actuation by a user indicative of an intention to drive the machine over a support surface;
 a power conversion system including a hydrostatic pump that is coupled to the engine and receives the torque output; and
 an electronic controller coupled to the user input device, the power conversion system and engine controller and configured to receive the user input and to responsively provide actuation signals to the power conversion system to implement travel functions, wherein the electronic controller is configured to receive the engine torque data signal from the engine controller and to provide the actuation signals according to a torque limiting profile, and wherein the electronic controller determines which of a plurality of portions of the torque limiting profile to use, to constrain the actuation signals, based upon a comparison of the engine torque load to a plurality of set point torques.

8. The power management system of claim 7, wherein the electronic controller is configured to provide the actuation signals unconstrained by the torque limiting profile when the engine torque load is below a first set point torque and to provide the actuation signals constrained by the torque limiting profile when the engine torque load is above the first set point torque.

9. The power management system of claim 8, wherein the electronic controller is configured to provide the actuation signals constrained by the torque limiting profile, when the engine torque load is above the first set point torque, to affect a rate of displacement change of the hydrostatic pump.

10. The power management system of claim 9, wherein when the engine torque load is above the first set point torque and below a second set point torque that is higher than the first set point torque, the electronic controller is further configured to provide the actuation signals constrained by the torque limiting profile to prevent an increase in the displacement of the hydrostatic pump if the engine torque load is above the second set point torque.

11. The power management system of claim 10, wherein when the engine torque load is above the second set point torque and below a third set point torque that is higher than the second set point torque, the electronic controller is further configured to provide the actuation signals constrained by the torque limiting profile to reduce the displacement of the hydrostatic pump.

12. The power management system of claim 7, wherein a first of the plurality of portions of the torque limiting profile causes the electronic controller to apply unconstrained actuation signals to the power conversion system, a second of the plurality of portions of the torque limiting profile causes the electronic controller to apply the actuation signals such that they are constrained to limit a rate of displacement change of the at least one pump, a third of the plurality of portions of the torque limiting profile causes the electronic controller to apply the actuation signals such that they are constrained to prevent displacement change of the at least one pump, and a fourth of the plurality of portions of the torque limiting profile causes the electronic controller to apply the actuation signals such that they are constrained to reduce displacement of the at least one pump.

13. A method of managing an engine torque load on a power machine, the method comprising:
 receiving an indication of the engine torque load;
 receiving an input from an operator input device; and
 providing actuation signals by an electronic controller, in response to the input from the operator input device, to a power conversion system coupled to the engine of the power machine and controlling engine torque load in response to the actuation signals, wherein the actuation signals are provided as a function of the engine torque load to implement a constraint on a rate of change of pump displacement of a hydrostatic pump according to a torque limiting profile.

14. The method of claim 13, wherein providing actuation signals according to the torque limiting profile further comprises:
 determining whether the engine torque load is above a first set point torque; and
 providing the actuation signals constrained by the torque limiting profile if the engine torque load is above the first set point torque.

15. The method of claim 14, wherein providing the actuation signals constrained by the torque limiting profile if the engine torque load is above the first set point torque further comprises limiting a rate of displacement increase of the hydrostatic pump.

16. The method of claim 15, wherein providing actuation signals according to the torque limiting profile further comprises:
 determining whether the engine torque load is above a second set point torque that is higher than the first set point torque; and providing the actuation signals constrained by the torque limiting profile to prevent a displacement increase of the hydrostatic pump when the engine torque load is above the second set point torque.

17. The method of claim 16, wherein providing actuation signals further comprises:

determining whether the engine torque load is above a third set point torque that is higher than the second set point torque; and providing the actuation signals constrained by the torque limiting profile to reduce the displacement of the hydrostatic pump when the engine torque load is above the third set point torque.

18. The method of claim 13 wherein providing actuation signals to the power conversion system includes implementing a constraint to reduce the pump displacement above a given engine torque load despite receiving an input from the operator device indicative of an intention to increase the pump displacement.

\* \* \* \* \*